Dec. 6, 1955  M. R. WEINGARTEN  2,725,678
SEALING APPARATUS FOR CATHODE-RAY TUBES
Filed June 4, 1953  2 Sheets-Sheet 1
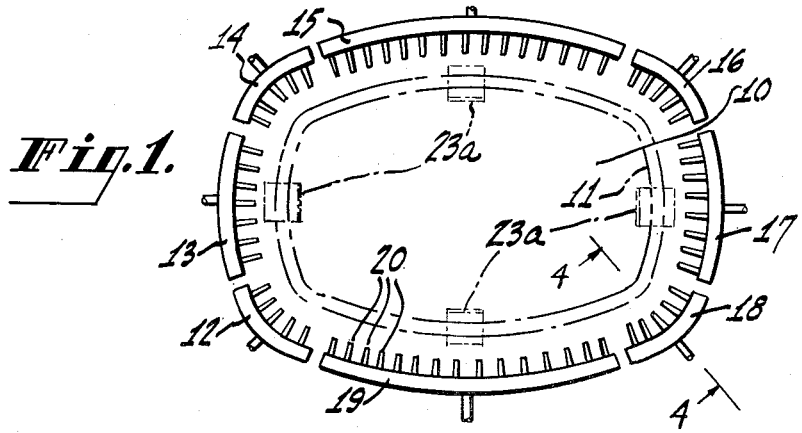
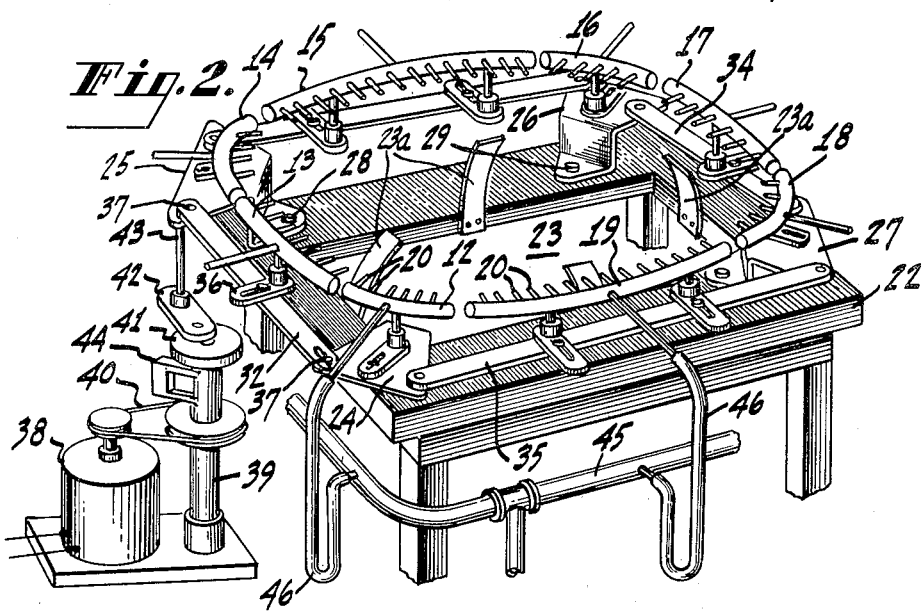
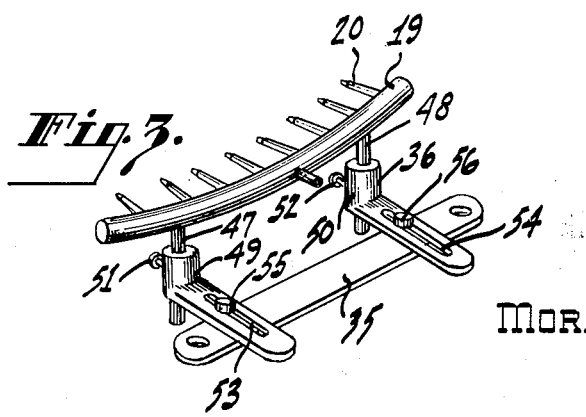
INVENTOR.
MORRIS R. WEINGARTEN
BY William A. Zalesak
ATTORNEY Dec. 6, 1955   M. R. WEINGARTEN   2,725,678
SEALING APPARATUS FOR CATHODE-RAY TUBES
Filed June 4, 1953   2 Sheets-Sheet 2
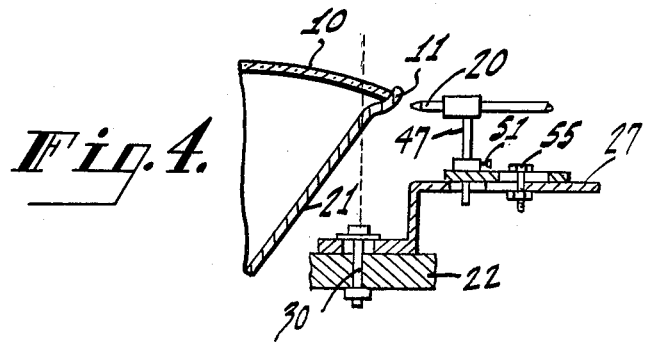
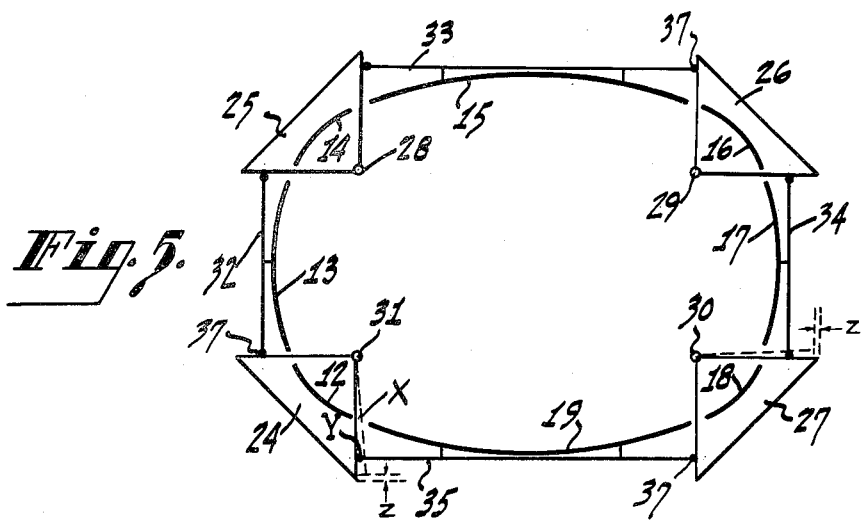
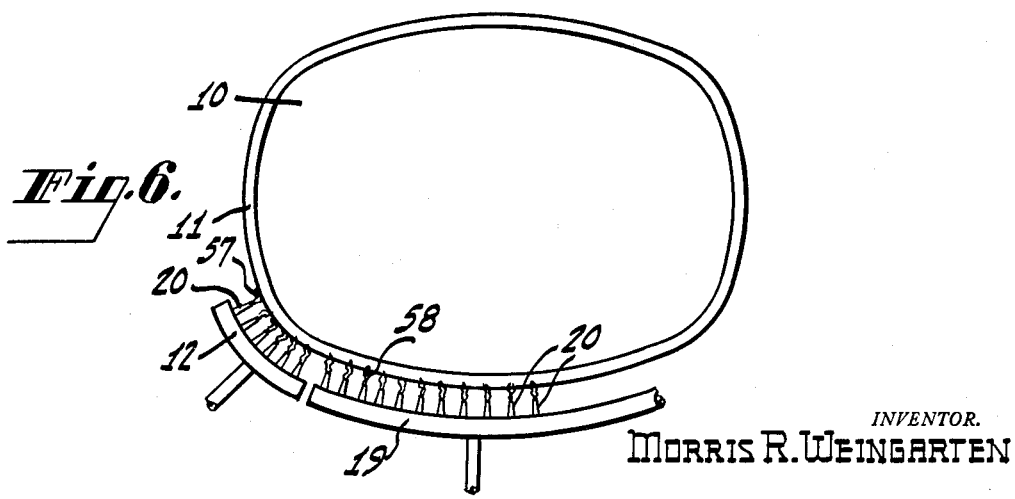
INVENTOR.
MORRIS R. WEINGARTEN
BY William A. Zalesak
ATTORNEY

United States Patent Office 2,725,678
Patented Dec. 6, 1955

2,725,678

SEALING APPARATUS FOR CATHODE-RAY TUBES

Morris R. Weingarten, Lancaster, Pa., assignor to Radio Corporation of America, a corporation of Delaware Application June 4, 1953, Serial No. 359,601

17 Claims. (Cl. 49—2)

The present invention relates to an apparatus for sealing a glass face plate to the wider end of a cone of a cathode-ray tube, and more particularly concerns an apparatus of this type having marked advantages when the face plate and the wider end referred to are roughly of rectangular shape, or of relatively large size.

Gas burners are usually employed to heat the glass face plate and the wider end of the cone to a sealing temperature. Such burners usually comprise a plurality of nozzles mounted in spaced relation on a manifold and directed toward the area to be sealed. The spaced relation of the nozzles results in spaced heat concentrations on the work to be sealed, unless relative movement is established between the work pieces and burner nozzles. When the work pieces constituting the face plate and wider end of the cone are round, such relative movement is accomplishd advantageously by rotating the work pieces within a circular array of burner nozzles. This distributes the heat from the nozzles evenly over the entire area to be sealed, and avoids the spaced heat concentrations aforementioned.

However, where the work pieces are rectangular, as indicated above, a serious problem is involved in realizing a uniform heat application to the area to be sealed. Thus, if the circular array of burners should be enlarged to permit rotation of rectangular work pieces therewithin, the burner nozzles would be unevenly spaced from the sealing areas and uneven heat applications thereto would result.

One attempt to overcome the aforementioned problem is presented in Patent 2,573,266 to Melcher et al. The apparatus shown in this patent requires a complicated structure by which a rectangular face plate and cone are rotated within a rectangular array of burner nozzles. To permit the burner to be substantially equidistant from the sealing area during rotation of the work pieces, a cam is provided that rotates with the work pieces and acts on supports for the burners to constantly re-orient the transverse axis of the burner array into the plane of that of the rotating face plate and cone.

Accordingly, it is a purpose of the invention to provide a sealing apparatus of simplified structure for sealing the face plate to the cone of a cathode-ray tube.

A further purpose is to provide a sealing apparatus for sealing the face plate to the cone of a cathode tube without rotation of the face plate and cone, thereby simplifying the apparatus.

Another object of the invention is to provide a sealing apparatus wherein relative movement between work pieces to be sealed and burner nozzles is accomplished by relatively small amplitude oscillations of the burner nozzles.

A further aspect is to provide a rectangular burner array adapted to oscillate around a fixedly supported rectangular work piece without appreciably changing the spacing between the burners of said array and said rectangular work piece, for evenly heating a predetermined sealing area of said work piece.

Another object is to provide a sealing apparatus having a rectangular burner array including one group of arcuately mounted burner nozzles and another group of substantially rectilinearly arrayed nozzles, and wherein the oscillations of the arcuately mounted nozzles are arcuate and the oscillations of said linearly arrayed burners are substantially rectilinear, whereby the spacing between said nozzles and rectangular work pieces to be sealed is substantialy unchanged during said oscillations.

A further purpose is to provide a closed burner array wherein the burners are adapted to oscillate in a path spaced from and substantially parallel to an annular sealing area, for uniform application of heat to said area.

Another purpose is to provide burner manifolds or segments defining a substantially rectangular array and wherein some of said segments are adapted to oscillate in longer movements than others of said segments for evenly heating an annular sealing area of work pieces to be sealed.

In one embodiment of the invention a sealing apparatus is provided including a plurality of manifolds or segments defining a substantially rectangular array. Each manifold or segment has a plurality of burner nozzles extending inwardly of said array. The array includes four arcuate segments forming the four corners of the rectangular array. Each of the four arcuate segments is mounted on a plate or crank pivotally mounted on a support. The pivotal point of each plate is spaced inwardly of said array for a purpose to be described. The arcuate segments aforementioned are supported on said plates intermediate the location at which said plates are pivoted and the ends of said plates remote from said locations for a purpose that will be apparent as the description proceeds.

Between said four arcuate segments are mounted four substantially straight segments to complete the rectangular array aforementioned. Each of said straight segments is mounted on two adjacent ends of said plates at locations thereon closer to said ends of the plates than the positions of said arcuate segments thereon, for pivotal movement with respect to said plates. When the four straight segments are so mounted, all the plates referred to are interconnected and oscillating movement of one plate transmits a similar movement to the other plates as well as to all the manifolds or segments referred to.

Power means are connected to one of the plates for causing oscillatory movement thereof, which movement as aforementioned is transmitted to the other three plates and to the eight manifolds or segments defining the rectangular array aforementioned. The apparatus is completed by the provision of a support for a cathode-ray tube and flexible conduits connecting each of the manifolds or segments to an appropriate source of combustible gas.

It will be noted from the foregoing that the axes of pivotal oscillations of the four plates are so located with respect to the rectangular array referred to, that the oscillations of the manifolds or segments occur in paths that effect no appreciable change in said array. Therefore, if the manifolds are initially in desired position with respect to an area to be sealed, such oscillations have no substantial effect on such position.

It will further be noted that while the burner nozzles extending from each of the arcuate manifolds, converge to thereby cause a substantial merging of flames therefrom on a portion of the area to be sealed, the burner nozzles on the straight manifolds are substantially parallel and flames therefrom are not therefore characterized by the aforementioned degree of merger. Therefore, in order to render the heat application by the nozzles on the straight manifolds, as uniform as that by the nozzles on the arcuate manifolds, it is desirable that the magnitude of the oscillatory movements of the straight manifolds be greater than that of the arcuate manifolds. This difference in the magnitude of the movements of the arcuate and straight manifolds is accomplished by mounting the arcuate manifolds on the plates intermediate the pivotal points of the plates and the positions at which the straight manifolds are mounted on the plates. This disposes the arcuate manifolds closer to the center of oscillatory movement of the plates than the straight manifolds and therefore causes the straight manifolds to travel through a greater distance than the arcuate manifolds during an oscillatory movement of the plates.

Further purposes and features of the invention will become evident from the following and more detailed description of an embodiment thereof, taken in connection with the appended drawing in which Figure 1 is a plan view partly in phantom showing the burner manifolds in a substantially rectangular array about a rectangular face plate and cone of a cathode-ray tube;

Figure 2 is a perspective view of the sealing apparatus of the invention;

Figure 3 is a perspective view of a burner manifold and indicates its manner of mounting;

Figure 4 is a fragmentary view partly in section taken along the line 4—4 of Figure 1;

Figure 5 is a schematic view of the apparatus of the invention and illustrates principles involved in its operation, and Figure 6 is a fragmentary plan view of two burner manifolds and shows the disposition of flames directed therefrom.

Referring now in more detail to the embodiment of the invention shown in the drawing, it will be noted that the apparatus depicted is particularly adapted to seal a face plate 10 of substantially rectangular shape, to a rim of flange 11 of a substantially rectangular cone of a cathode-ray tube, as shown in Figure 1. To this end, the apparatus includes a plurality of manifolds or segments 12 to 19 having burner nozzles 20. The manifolds referred to are so shaped and positioned with respect to each other that they define a substantially rectangular array spaced from but analogous to the shape of the face plate and rim aforementioned. The burners 20 extend inwardly of said array and toward said rim 11 of cone 21, as shown best in Figure 4.

As shown in Figure 2, the apparatus includes a fixed support such as a table 22 having an opening 23 in a surface thereof for receiving a cathode-ray tube envelope portion. Mounted on the table 22 are plurality of fingers 23a for engaging and supporting the cathode-ray tube. The fingers 23a are so positioned that when they engage the cone 21 of the envelope portion, they dispose the rim 11 of the cone in a predetermined plane. Mounted on the table 22 are a plurality of offset plates 24 to 27, pivotally movable on pins 28 and 29 shown in Figure 2 and pins 30 and 31 shown in Figure 5. The plates referred to support the manifolds 12 to 19 aforementioned, so as to dispose the burner nozzles 20 thereof in said predetermined plane.

The support aforementioned of the manifolds on the plates 24 to 27 is accomplished differently in connection with the arcuate manifolds 12, 14, 16 and 18 than in connection with the substantially straight manifolds 13, 15, 17 and 19 for a purpose that will become evident.

The arcuate manifolds 12, 14, 16, and 18 are fixed to upper surfaces of offset plates 24 to 27 at locations thereon intermediate the engagements of the plates with pins 28 to 31 and edges of the plates remote from said pins. The pins referred to, engaging the lower offset portion of the plates aforementioned are disposed inwardly of the array of manifolds so as to be in substantial axial alignment with the centers of curvature of the four rounded corners of rim 11 of a cathode-ray tube cone 21, as shown in Figure 4. Oscillatory movements of plates 24 to 27 therefore will occur about centers common to the arcuate manifolds and the rounded corners of the cone rim. Such movements of the arcuate manifolds will therefore be parallel to the rounded rim and will preserve an even application of heat to said rim during said movements.

While the arcuate burners referred to require arcuate oscillatory movements to prevent undesired movement of the burner nozzles 20 thereon away from or toward the rim 11, the substantially straight manifolds require that the movements thereof be longitudinal and substantially rectilinear for a similar purpose. To provide such rectilinear movement, the straight manifolds are mounted on levers or links 32 to 35 by means of adjustable brackets 36. The ends of each lever are in pivotal engagements with the upper portion of adjacent ones of offset plates 24 to 27 by means of pins 37. The end of one of the levers, such as 32, is slotted over the pivot connection 37, in a longitudinal direction to avoid locking the linkage due to angularity effects. These engagements result in a linked structure forming a closed array. Oscillatory movements imparted to one portion, such as plate 25, of said linked structure will result in the transmission of similar movements to the other plates 24, 26, 27. Such movements of the plates will cause the arcuate manifolds 12, 14, 16, 18 to move arcuately and the substantially straight manifolds 13, 15, 17, 19 to move substantially along their longitudinal axes.

Means are provided for imparting the oscillatory movements aforementioned. This means may comprise a motor 38, a shaft 39 driven by said motor through belt or chain 40, a disc 41 fixed to one end of shaft 39 for rotation therewith, and a lever assembly comprising lever 42 and pin 43 connected eccentrically and pivotally to one face of said disc and to plate 25. If desired, the lever 42 may be directly connected to plate 25. A weight 44 fixed to shaft 39 and extending from a side thereof, may be provided for controlling the oscillatory movements of the linked burner support structure aforementioned, such as by absorbing shocks incidental to such movements.

For supplying the manifolds 12 to 19 and burner nozzles 20, with a suitable combustible gas, a supply manifold 45 communicates with a source, not shown, of gas under pressure, and a plurality of flexible conduits 46, connects the segments or burner manifolds 12 to 19 to said supply manifold.

In order to render the sealing apparatus of the invention adjustable for processing cathode-ray tubes of different size, the manifold segments of the burner are adjustable vertically and horizontally. As shown in Figure 3, the burner manifolds include depending pins 47, 48, which are slidingly received in sleeves 49, 50 integral with brackets 36. When the burner manifold is raised or lowered in sleeves 49, 50 to a desired position, it may be fixed in said position by set screws 51, 52.

The aforementioned operation of adjusting a burner manifold vertically to desired position, is the same with respect to all the manifolds 12 to 19. The larger manifolds 15, 19 are supported at two spaced locations as shown in Figure 3, while the smaller manifolds 12, 13, 14, 16, 17, 18 are supported at one location only.

The horizontal adjustment of the burner manifolds is accomplished by moving the brackets 36 transversely of the levers or links 35, such movement being permitted by the slots 53, 54 in the brackets as shown in Figure 3. When the burner manifolds are adjusted to a desired horizontal position, they may be fixed in this position by means of set screws 55, 56.

While the oscillatory movements of the burner manifolds as aforementioned contribute to a uniform application of heat to the area to be sealed, a further contribution to such heat uniformity is effected by a novel arrangement whereby the arcuate manifolds are moved through shorter distances than the straight manifolds. As is apparent from Figure 6, flames 57 from the nozzles 20 of the arcuate manifold 12 are bunched relatively closely due to the convergence of the nozzles referred to. The space between adjacent flames from manifold 12 is therefore relatively small. Hence the magnitude of oscillatory movement of manifold 12 required for causing the flames 57 to traverse said space, is also relatively small.

On the other hand, the burner nozzles 20 on manifold 19 are substantially parallel, and the flames 58 from said nozzles are appreciably spaced from each other and to a greater degree than the flames 57 from manifold 12. Therefore, to cause flames 58 to traverse the space therebetween for uniform heat application, the oscillatory movements of the straight manifold 19 should be of greater magnitude than the movements of the arcuate manifold 12.

An arrangement for providing the aforementioned difference in magnitude of the movements of the arcuate manifolds and the straight manifolds, according to the invention, is shown schematically in Figure 5. According to this arrangement, the arcuate manifolds 12, 14, 16, 18 are mounted on plates 24 to 27 intermediate the plate pivotal points 28 to 31 and the edges of the plates remote from such pivotal points. This determines the magnitude of the oscillatory movements of the arcuate manifolds aforementioned which may have a value represented by the arc X.

The levers or links 32 to 35 to which the straight manifolds are fixed, may pivotally engage the plates 24 to 27 at portions thereof more remote from the pivotal points 28 to 31 than the arcuate manifolds 12, 14, 16, 18. Oscillatory movements of the plates aforementioned therefore will cause the links and straight manifolds to oscillate in movements of greater magnitude than that of the arcuate manifolds. Such greater magnitude of movement may be that represented by the arc Y.

The arrangement aforementioned provides different magnitudes of movement for the arcuate and straight manifolds, supplementing therefore the oscillatory movements per se, in providing uniform heat application by the sealing apparatus of the invention.

While the oscillatory movements of the straight manifolds 13, 15, 17, 19, through arc Y includes a relatively small component normal to the axis of the manifold array, this component may be reduced to a minimum represented by the distance Z in Figure 5, by shaping the plates 24 to 27 so that adjacent edges of each plate at the pivotal points 28 to 31 diverge at right angles to each other. Since the pivotal points 37 for the levers 32 to 35 are at the edges of the plates 24 to 27, two equal radii drawn from each of the pivotal points 28 to 31 of the plates to the pivotal points 37, will therefore be at right angles to each other. This will dispose links 32 to 35, in tangent relation to circles described about said pivotal points 28 to 31, and reduce to a minimum the component of movement of the links in a direction transverse of the manifold array.

It will be apparent from the foregoing that a novel, advantageous and relatively simple apparatus is provided for sealing work pieces such as the face plate and rim of a cathode-ray tube envelope portion that may be of metal, for example. While the apparatus of the invention is particularly useful in sealing work pieces having a rectangular area array to be sealed, it can also be employed to advantage in sealing work pieces having sealing areas defining arrays other than rectangular, such as a circular array, for example. As the size of cathode-ray tubes is increased, the problem of supporting the tube work pieces to be sealed for movement becomes more serious, due to the weight and volume of such pieces. The apparatus of the invention meets this problem very effectively by permitting the tube work pieces to remain stationary during operation of the apparatus.

What is claimed is:

1. A sealing apparatus for cathode-ray tubes comprising fixed means adapted to support cathode-ray tube envelope parts comprising a cone and glass face plate in sealing position, a closed array of burners movably mounted on said support means adjacent areas of said face plate and cone to be sealed, said burners being grouped in a plurality of segments of different shape, and means for moving said segments for even application of heat to said areas, said last named means comprising a plurality of supports for said segments, one of said supports being mounted for pivotal movement only, on a fixed axis normal to the plane of said array and supporting a segment of one shape, another of said supports being linked to said one of said supports for substantially rectilinear movement and supporting a segment of a shape different from said one shape, whereby said segments of different shape are moved differently by said supports for heating differently shaped portions of said areas to be sealed.

2. A sealing apparatus for cathode-ray tubes, comprising a fixed support adapted to support sub-assemblies of such tubes comprising a cone and face plate with edges of said face plate engaging the rim of said cone in an area to be sealed, a closed array of heating elements movably mounted on said support and adapted to embrace said area to be sealed, and means for moving said heating elements in directions substantially parallel to said area for evenly heating the same, said elements comprising two adjacent groups, the elements in one of said groups being arcuately arrayed, the elements in the other of said groups being arrayed substantially rectilinearly, said means comprising a first member mounted for arcuate movement only, on a fixed pivot, said group of arcuately shaped elements engaging said member at a portion thereof adjacent said fixed pivot, and a second member pivotally engaging a portion of said first member remote from said fixed pivot, whereby the movements of said one of said group of elements are different from the movements of the other of said group of elements, for uniformly heating said area to be sealed when said sub-assemblies are non-circular.

3. Apparatus for sealing the face plate of a cathode-ray tube across the wider end of a cone forming a portion of the envelope of said tube and having a non-uniform edge contour, comprising means for fixedly supporting said cone with said wider end thereof extending upwardly and with said face plate engaging the edge of said cone at said wider end thereof, an array of heating elements disposed about said edge and movably supported on said means for supporting, said heating elements being grouped on two separate manifolds, one of said manifolds having an appreciable curvature in a plane parallel to said edge, the other of said manifolds being substantially rectilinear, whereby said manifolds are adapted to be spaced uniformly from said non-uniform edge, and means for moving said array of heating elements for uniform application of heat by said elements to said edge for providing a uniform seal between said face plate and cone, said last named means being differently connected to said two separate manifolds, for oscillating said one of said manifolds arcuately only and for reciprocating said other of said manifolds rectilinearly only.

4. Apparatus for sealing the face plate to the cone of a cathode-ray tube envelope, comprising a fixed support adapted to support said cone with the wider end thereof extending upwardly and with edge of said face plate engaging said wider end in an area to be sealed, a plurality of spaced burner nozzles movably mounted on said fixed support and adapted to be disposed adjacent said area to be sealed, and means for moving said burner nozzles to cause said nozzles to overlap the spaces separating them, whereby flames from said nozzles are adapted to evenly heat said area to be sealed, one group of said nozzles converging appreciably toward a common point, another group of said nozzles being substantially parallel, said last named means being connected to said one group of nozzles for oscillating said nozzles in relatively short paths parallel to said area to be sealed, said another group of nozzles being connected to said one group of nozzles for reciprocating said another group of nozzles in relatively long paths.

5. Sealing apparatus for cathode-ray tubes, comprising in combination means for supporting against movement a cone and face plate to be sealed to provide a fixed area to be sealed, a plurality of spaced heating elements adjacent said area and movably mounted on said supporting means, and power transfer means connected to one group of said elements for oscillating them in arcuate paths of predetermined length, said last named means being connected to another group of said elements for reciprocating the same in rectilinear paths having a length greater than said predetermined length, said two groups of paths being opposite and substantially parallel to said area, for uniformly heating said area.

6. Sealing apparatus for cathode-ray tubes of the type having a substantially rectangular face plate, comprising fixed means for supporting a cone envelope portion having a rectangular end with said end extending upwardly and with a rectangular face plate loosely positioned at said end in predetermined position for providing a desired sealing area of rectangular array having a curved corner portion and a straight side, a plurality of burner units disposed in a rectangular array and movably mounted on said fixed means and adapted to surround and heat said sealing area, and means connected to one group of said burner units for oscillating the same in paths substantially parallel to said curved corner portion of said sealing area said last named means being also connected to another group of burner units for reciprocating the last named units in a path substantially parallel to said straight side of said sealing area, for uniform application of heat to said area.

7. Apparatus for sealing the face plate to the cone of a rectangular cathode-ray tube, comprising a fixed support having an opening adapted to receive said cone with the wider end thereof extending upwardly and with said face plate loosely positioned across said wider end and having edges engaging said cone in an area to be sealed, a linked assembly movably mounted on said fixed support and surrounding said opening, a plurality of burner manifolds having burner nozzles mounted on said linked assembly, said manifolds being adjustable with respect to said assembly for disposing said nozzles opposite and adjacent to said sealing area said assembly including two spaced pivoted members, two of said manifolds being supported on said pivoted members for arcuate movement only, a link connecting said pivoted members, said link responding in substantially rectilinear movement to arcuate movement of said pivoted member, a third of said manifolds being supported on said link, and means connected to one of said pivoted members for oscillating said pivoted members and for reciprocating said link to cause flames from said nozzles to uniformly traverse said area for providing a good seal between said face plate and cone.

8. Apparatus for sealing the face plate to the cone of a rectangular cathode-ray tube wherein the wider end of said cone and said face plate have corresponding rounded corners and substantially straight sides for engagement in a sealing area, said apparatus comprising a fixed support adapted to receive said cone with said wider end thereof extending upwardly and with said face plate loosely positioned over said end and engaging said cone at said sealing area, a rectangular array of burner manifolds adapted to encompass said sealing area, four of said manifolds having a curvature substantially equal to that of said rounded corners and adapted to be disposed opposite said rounded corners, the others of said manifolds being substantially rectilinear and adapted to be disposed opposite said substantially straight sides, pivoted supports for said four manifolds mounted on said fixed support, whereby said four manifolds are arcuately movable with respect to said fixed support in response to pivotal movement of said pivoted supports, links connecting said pivoted supports, said others of said manifolds being fixed to said links, whereby said others of said manifolds are movable substantially rectilinearly in response to pivotal movement of said pivoted supports, and means connected to one of said pivoted supports for pivotally oscillating the same, whereby said manifolds are moved in paths substantially parallel to said sealing area for evenly distributing flames from said manifolds on said sealing area.

9. Apparatus for sealing a substantially rectangular face plate having rounded corners to a similarly shaped open end of the cone of a cathode-ray tube; comprising fixed means for supporting said cone with said open end extending upwardly and with said face plate loosely in desired sealing position across said open end and engaging said end in an area to be sealed; a closed array of burner units movably mounted on said fixed support, said units comprising members pivoted to said fixed support at spaced locations within said array, and arcuate manifolds fixed to said members and having burner nozzles directed inwardly of said array and adapted to be disposed opposite and in parallel relation to said rounded corners of said sealing area, said burner units being linked together for synchronous movement; and means connected to one of said units for oscillating said units, whereby said units oscillate in angular movements only for preserving said parallel relation and uniformly heating said rounded corners.

10. Apparatus for sealing a substantially rectangular face plate having rounded corners to a similarly shaped flanged end of a hollow envelope portion of a cathode-ray tube, said apparatus comprising a fixed support having a horizontal surface, a plurality of linked members alternate ones only of which are pivotally mounted on said support for movement in paths parallel to said surface, a plurality of burner manifolds mounted on said members, said manifolds defining a closed array having a shape similar to that of said face plate and flanged end and adapted to receive said face plate and flanged end, said array being parallel to said horizontal surface, said support having an opening in said surface adapted to receive said envelope portion with said flanged end extending upwardly and with said face plate in edge engagement with said flanged end and to dispose the area of said edge engagement opposite the sides of said manifolds facing inwardly of said closed array for heating said area, and power means connected to one of said linked members for moving said manifolds in paths around said flanged end and parallel to said edge engagement for evenly heating said area of edge engagement.

11. Apparatus for sealing a substantially rectangular flanged end of a cathode-ray tube envelope portion to a viewing plate, comprising a fixed support having a horizontal surface, a plurality of burner manifolds mounted on said support for movements in paths parallel to said surface, said manifolds defining a closed rectangular array upwardly spaced from and parallel to said surface and adapted to receive said flanged end, said fixed support having an opening in said surface within said array adapted to receive said envelope portion with said flanged end extending upwardly and with said face plate in engagement with said flanged end in an area to be sealed, means mounted on said support adapted to support said envelope portion with said area to be sealed within and in the plane of said rectangular array, whereby said area is adapted to be heated to sealing temperature by flames from said manifolds directed inwardly of said array, and means connected to said manifolds for moving said manifolds in said paths for uniform distribution of said flames on said area to be sealed, said last named means comprising four plates pivoted to said support for oscillating movements on an axis normal to said support surface, four of said manifolds being curved in a plane parallel to said surface and fixed to said plates for movement therewith, and four links connecting said plates and movable in substantially rectilinear paths in response to the movements of said plates, four others of said manifolds being substantially rectilinear and fixed to said links in parallel relation to said last named paths, whereby said manifolds are adapted to be moved in synchronism in paths substantially equidistantly spaced from said areas to be sealed.

12. Apparatus for sealing a substantially rectangular end of a cathode-ray tube envelope portion having curved corners to a face plate, comprising a fixed support having a horizontal surface, a rectangular array of burner manifolds upwardly spaced from said surface and adapted to receive said rectangular end, said manifolds including one group of manifolds defining the corners of said array and another group defining the sides of said array, the manifolds of said one group having a curvature similar to that of the corners of said rectangular end, the manifolds of said another group being substantially straight, support means for said one group of manifolds pivoted to said fixed support for angular movements parallel to said surface, other support means for said another group of manifolds pivotally mounted on said first named support means for substantially rectilinear movements parallel to said surface, said fixed support being adapted to receive said envelope portion with said end thereof extending upwardly to said array of burner manifolds and with said face plate engaging said end in a sealing area, and means for pivotally oscillating said first named support means for oscillating said one group of manifolds in arcuate paths, and for moving said another group of manifolds in substantially rectilinear paths for even distribution of flames from said manifolds to said sealing area.

13. Apparatus for sealing a face plate to a cathode-ray tube envelope portion having an open end of non-circular shape, comprising a fixed support, a plurality of linked members mounted on said support and movable with respect thereto, a plurality of burner manifolds fixed to said members and defining a closed array having said non-circular shape and adapted to receive said open end, said fixed support being adapted to receive said envelope portion with said face engaging said open end thereof in an area to be sealed and to dispose said area to be sealed within said closed array, power means, connecting means between said power means and one of said linked members for moving said linked members and said manifolds back and forth for evenly heating said area to be sealed to sealing temperature, said connecting means including a shaft engaging said power means for rotation and a weight fixed to a side of said shaft and extending outwardly therefrom for absorbing shocks produced by said linked members when oscillating.

14. Apparatus for sealing a face plate to a substantially rectangular open end of a cathode-ray tube envelope portion, comprising a fixed support adapted to receive said envelope portion with said face plate engaging said open end in a rectangular area to be sealed and to dispose said area to be sealed in a predetermined plane, a linked assembly including elements pivotally mounted on said support, a plurality of burner manifolds mounted on said linked assembly and defining a rectangular array in said plane adapted to receive said area to be sealed, and means connected to said linked assembly for moving said manifolds back and forth to evenly distribute heat therefrom to said area to be sealed.

15. Apparatus according to claim 14 and wherein said linked assembly includes four plates having edges within said array, said plates being in pivoted engagement with said fixed support adjacent said edges, said plates extending outwardly of said array to another edge, adjacent ones of said plates having two of said first-named edges in parallel relation and extending outside of said array, links pivotally connected to said plates adjacent said parallel edges and said another edge and outside of said array for linking adjacent plates, and means for oscillating said plates in the plane of said array and on said pivotal engagements, whereby manifolds mounted on said links are caused to move in substantially rectilinear paths for evenly heating the sides of said rectangular area to be sealed.

16. Apparatus for heating a fixed non-circular sealing region, comprising a plurality of burner segments each having a shape for uniform spacing from said region, spaced pivotal supports for two of said segments, said pivotal supports being pivoted on axes extending inside of said sealing region, and an elongated link supporting another of said segments, the ends of said link being pivotally connected to said pivotal supports on axes parallel to said first named axes and extending outside of said sealing region.

17. Apparatus for heating a non-circular sealing region comprising a plurality of burner segments disposed in an array outside of said non-circular sealing region, some of said segments having a greater curvature in the plane of said array than others of said segments for rendering said array similar in contour to said sealing region, supports for said some of said segments, said supports being pivoted on axes within said array for oscillating movements in the plane of said array, supports for said others of said segments, said last named supports being pivoted to said first named supports outside of said array and on axes parallel to said first named axes, and power means connected to one of said first named supports for oscillating the same, whereby all of said first mentioned supports oscillate and all of said second named supports reciprocate for uniformly heating said sealing region.

References Cited in the file of this patent
UNITED STATES PATENTS

| | | |
|---|---|---|
| 1,577,538 | Parker | Mar. 23, 1926 |
| 2,573,266 | Melcher et al. | Oct. 30, 1951 |
| 2,580,450 | Melcher et al. | Jan. 1, 1952 |
| 2,654,181 | Lucarelli | Oct. 6, 1953 |